United States Patent Office 2,968,534
Patented Jan. 17, 1961

2,968,534
METHOD FOR PREPARATION OF DECABORANE

Gerard F. Judd, Austin, Tex., assignor to Callery Chemical Company, Pittsburgh, Pa., a corporation of Pennsylvania No Drawing. Filed Feb. 20, 1956, Ser. No. 566,336

8 Claims. (Cl. 23—204)

This invention relates to an improved method for the preparation of decaborane and in particular it relates to a new and improved method for preparing decaborane in good yields by heating a mixture of diborane and tetraborane under pressure and bleeding off the hydrogen formed either intermittently or continuously.

Decaborane is a well-known and well-characterized chemical compound. However, methods of preparing it in good yields are non-existent. Decaborane is a solid but its lower alkyl derivatives are liquids with high heats of combustion. Since decaborane can be readily alkylated, it has become increasingly important to find methods of preparing decaborane in good yields. Stock and his co-workers first prepared decaborane in 1913 by the pyrolysis of diborane and later by the pyrolysis of tetraborane. These methods produced extremely low yields of decaborane on the order of 10% or less. Further study of these reactions has resulted in a substantial increase in the yield of decaborane to 50% or more.

It is an object of the present invention to provide a new and improved method for the preparation of decaborane.

Another object of this invention is to provide an economical method of preparing decaborane in good yields by the pyrolysis of a mixture of substantially pure diborane and tetraborane under pressure.

Other objects will appear throughout the following specification and appended claims.

This new and improved method of preparing decaborane will be completely described hereinafter and the novelty thereof will be particularly pointed out and distinctly claimed.

This invention is based upon the discovery that when tetraorane or diborane alone is heated at about 100°–110° C., only a small amount of decaborane is formed but when a mixture of substantially pure tetraborane and diborane is heated, a far greater conversion and yield of decaborane is obtained. Thus, it is apparent that tetraborane and diborane are essential intermediates in the formation of decaborane. It has also been found that considerable hydrogen is evolved in the formation of decaborane. When this hydrogen is vented, the polymerization to decaborane proceeds much more rapidly. Thus, when a tetraborane-diborane mixture was heated for eight hours at 85°–90° C. without venting the hydrogen a 3% yield of decaborane was obtained. In another experiment in which the hydrogen was removed a 26% yield of decaborane was obtained in 90 minutes at the same temperature. By bleeding hydrogen from a tetraborane-diborane mixture heated at 92° C. for 1700 minutes, a 51.5% yield of decaborane was obtained.

The procedure used for the experiments reported was as follows: the reactants were condensed in a 125 ml. stirred autoclave by means of liquid nitrogen cooling and heated for a given period. The liquid products were collected and weighed in consecutive Dry Ice cooled traps and any unconverted diborane was collected in a liquid nitrogen trap followed by a methanol scrubber. The liquids were pumped off the solids into cold traps maintained at −78° C. The decaborane contained in the solids was extracted with pentane, the solvent was evaporated and the decaborane was purified by sublimation.

In one series of runs, substantially pure diborane and substantially pure tetraborane were mixed in various proportions and heated for varying lengths of time in an autoclave under the combined pressure of the two reactants with the following results.

| Run No. | g. $B_2H_6$ Charged | g. $B_4H_{10}$ Charged | Temp., °C. | Heating time (mins.) | Percent Yield $B_{10}H_{14}$ |
|---|---|---|---|---|---|
| 1 | 24.0 | 6.0 | 110 | 200 | 25.7 |
| 2 | 25.1 | 4.9 | 97 | 70 | 12.5 |
| 3 | 18.7 | 7.7 | 92 | 1,700 | 51.5 |

In runs 1 and 3, the hydrogen formed was bled off intermittently while in run 2, the hydrogen was bled off continuously. It is apparent from run 2 that a short period of heating results in a lower yield of decaborane. It is also obvious from the runs reported that a substantial amount of tetraborane must be present with the diborane in order to obtain good yields of decaborane. The amount of tetraborane preferred is about 20–50% of the amount of diborane used.

Tetraborane can be obtained by the pyrolysis of diborane. However, other higher boron hydrides are formed which interfere with the formation of decaborane and thus result in lower yields of decaborane. When the tetraborane is separated from the higher boron hydrides and then pyrolyzed with diborane, a significantly greater yield of decaborane is obtained than when either tetraborane or diborane is pyrolyzed alone. Continuous bleeding of the hydrogen evolved during the pyrolysis prevents the decomposition of the tetraborane and enhances the reaction of tetraborane with diborane to form decaborane.

Having thus described this invention fully and completely as required by the patent statutes, it should be understood that other variations are possible and that within the scope of the appended claims this invention may be practiced otherwise than as specifically described.

What is desired to be claimed and secured by letters patent of the United States is:

1. A method of preparing decaborane which comprises heating a mixture consisting essentially of substantially pure diborane and substantially pure tetraborane under the combined pressure of the two reactants, removing the hydrogen evolved and recovering the decaborane from the reaction products.

2. A method according to claim 1 in which the amount of tetraborane present in the mixture is about 20–50% of the amount of diborane used.

3. A method according to claim 1 in which the diborane-tetraborane mixture is heated at a temperature of about 90–110° C.

4. A method according to claim 1 in which the reactants are heated for a period of 1 to 30 hours.

5. A method according to claim 1 in which the hydrogen is bled off continuously.

6. A method according to claim 1 in which the hydrogen is removed intermittently.

7. A method of preparing decaborane which comprises heating a mixture of one part tetraborane and 2 parts diborane under pressure at a temperature of about 90° C. for approximately 30 hours, removing the hydrogen evolved intermittently during the heating period and recovering the decaborane formed from the solid reaction products by solvent extraction and subsequent sublimation.

8. A method according to claim 7 in which the solvent used to extract the decaborane is pentane.

References Cited in the file of this patent

Schechter et al.: "Preparation of Pentaborane and the Evaluation of the Hazards of Handling Diborane and Pentaborane," Report No. MSA-9973, FR., Navy Contract NOa(s)9973, pages 4, 5, 7 (December 1, 1950). Declassified May 11, 1954, Bureau of Aeronautics, Dept. of Navy.

Stock: "Hydride of Boron and Silicon," page 80, Cornell University Press (1933).

Sidgwick: "Chemical Elements and Their Compounds," vol. I, page 346 (1950), Univ. Press, Oxford.

Schechter et al.: "Boron Hydrides and Related Compounds," pages 13, 26, 37, January 8, 1951, declassified January 5, 1954, Dept. of Navy, Bureau of Aeronautics.